(12) United States Patent
Ealey

(10) Patent No.: US 7,195,361 B2
(45) Date of Patent: Mar. 27, 2007

(54) ACTIVE HYBRID OPTICAL COMPONENT

(75) Inventor: Mark A. Ealey, Littleton, MA (US)

(73) Assignee: Xinetics, Inc., Devens, MA (US)

( * ) Notice: Subject to any disclaimer, the term of this patent is extended or adjusted under 35 U.S.C. 154(b) by 0 days.

(21) Appl. No.: 11/039,132

(22) Filed: Jan. 19, 2005

(65) Prior Publication Data

US 2006/0158753 A1 Jul. 20, 2006

(51) Int. Cl.
*G02B 5/08* (2006.01)
*G02B 7/183* (2006.01)
*G02B 7/185* (2006.01)
*G01J 1/20* (2006.01)

(52) U.S. Cl. .................... 359/849; 359/846; 250/201.9

(58) Field of Classification Search ................ 359/846, 359/848, 849, 871; 250/201.9; 356/512, 356/513, 514
See application file for complete search history.

(56) References Cited

U.S. PATENT DOCUMENTS

| 4,066,343 A | * | 1/1978 | Scott ........................... 359/849 |
| 4,091,274 A | * | 5/1978 | Angelbeck et al. ...... 250/201.9 |
| 4,093,351 A | * | 6/1978 | Perkins et al. .............. 359/847 |
| 4,226,507 A | * | 10/1980 | Fuschetto .................... 359/849 |
| 5,365,379 A | * | 11/1994 | Sawicki ....................... 359/846 |
| 5,798,878 A | * | 8/1998 | Asari et al. .................. 359/846 |
| 5,831,780 A | | 11/1998 | Krim |

OTHER PUBLICATIONS

Barbee, Jr. "Optical Applications of Nano-Laminates", Space Optics Manufacturing Technology Center, Tech Day 2003 Presentations, Sep. 16-18, 2003, pp. 1-20. http://optics.nasa.gov/tech_days/tech_2003/.*

National Reconnaissance Office, "Nanolaminate Hybrid Mirror Technology and X-Sat Flight Experiment", Space Optics Manufacturing Technology Center, Tech Day 2003 Presentations, Sep. 16-18, 2003, pp. 1-21.*

Cornie et al, "Development of Graphite Fiber Reinforced Mg Alloys for Use as Space and Tactical Mirrors", Space Optics Manufacturing Technology Center, Tech Day 2003 Presentations, Sep. 16-18, 2003, pp. 1-48.*

Matson et al, Advanced Materials and Processes for Large, Lightweight, Space-Based Mirrors, Aerospace Conference, 2003, Proceedings 2003 IEEE Vol. 4, Mar. 8-15, 2003, pp. 1-17. ☐☐http://ieeexplore.ieee.org/xpl/tocresult.jsp?isnumer=27670.*

John W. Hardy; Active Optics: A New Technology for the Control of Light; Proceedings Of The IEEE, vol. 66, No. 6, Jun. 1978, pp. 651-697.*

Sarma N. Gullapalli et al; Hinged Substrate for Large Aperture Lightweight Deformable Mirrors-A Novel Concept; Proceedings Of SPIE, vol. 4849 (2002), pp. 305-320.*

Gregory S. Hickey et al; Nanolaminate Mirrors With Integral Figure- Control Actuators; Jet Propulsion Laboratory; May 1, 2002, pp. 1-30.*

U.S. Appl. No. 10/730,412, filed Dec. 8, 2003.
U.S. Appl. No. 10/936,229, filed Sep. 8, 2004.
U.S. Appl. No. 10/935,889, filed Sep. 8, 2004.
U.S. Appl. No. 10/730,514, filed Dec. 8, 2003.
U.S. Appl. No. 10/914,450, filed Sep. 9, 2004.

* cited by examiner

*Primary Examiner*—Ricky D. Shafer
(74) *Attorney, Agent, or Firm*—Iandiorio & Teska

(57) ABSTRACT

An active hybrid optical component includes a substrate including a mounting surface; a replicated optical surface mounted on the mounting surface; and a plurality of actuators for deforming the substrate to impose a predetermined finished optical shape to the replicated optical surface.

25 Claims, 20 Drawing Sheets

ACTIVE HYBRID OPTICAL COMPONENT

FIELD OF THE INVENTION

This invention relates to an active hybrid optical component, and more particularly to such an active hybrid optical component which has an excellent optic figure and finish, is lightweight and can be fabricated by replication.

BACKGROUND OF THE INVENTION

Light weight optical components such as mirrors are made of glass, beryllium, Ceraform and other materials such as SiC or metal. Glass components are often made by machining away a glass blank to a lightweight structure. The resulting glass optical component typically has a modulus of elasticity of 10 msi with weight of 20–40 Kg/m$^2$ Components of beryllium have the same general characteristics but with modulus of elasticity of 70 msi. Ceraform SiC results in a lightweight near net shape with approximately 0.1% shrinkage and a modulus of elasticity of 50 msi. Ceraform SiC is a directly polishable version of siliconized silicon carbide that can be near net shape formed and is obtainable from Xinetics, Inc, Devens, Mass. However, these devices still require significant cost and time to finish and polish and cannot practically approach the finish possible with glass.

BRIEF SUMMARY OF THE INVENTION

It is therefore an object of this invention to provide an improved active hybrid optical component.

It is a further object of this invention to provide such provide an improved active hybrid optical component which is lightweight yet stiff.

It is a further object of this invention to provide such provide an improved active hybrid optical component which has excellent optical finish and figure yet is easier and faster to make and can be easily replicated too.

The invention results from the realization that an improved optical component, which has a high quality optical finish and figure, lightweight and stiffness and which can be replicated for manufacture, can be achieved with a substrate having a mounting surface on which is mounted a replicated optical surface and a plurality of actuators for deforming the substrate to impose a predetermined finished optical shape or figure to the replicated optical surface.

The subject invention, however, in other embodiments, need not achieve all these objectives and the claims hereof should not be limited to structures or methods capable of achieving these objectives.

This invention features an active hybrid optical component including a substrate having a mounting surface, a replicated optical surface mounted on the mounting surface; and a plurality of actuators for deforming the substrate to impose a predetermined finished optical shape to the replicated optical surface.

In a preferred embodiment the replicated optical surface may include a nanolaminate, glass, or MYLAR® (ethylene glycol and dimethyl terephthalate) film. The replicated optical surface may include a nanolaminate made from zirconium-copper, INVAR® (an alloy comprising iron, nickel, carbon and chromium) or MONEL®-titanium (an alloy comprising iron, nickel, carbon and chromium). The substrate may include glass, silicon carbide, beryllium, carbon fiber reinforced polymer, metal matrix composites, glass matrix composites, or carbon matrix composites. The substrate and the plurality of actuators may be configured in an integrated active substrate. The actuators may be generally parallel to the mounting surface or generally transverse to the mounting surface. The actuators may be electromagnetic, or electrostrostrictive. The replicated optical surface may be mounted by brazing, solder, diffusion bonding, or an adhesive. The adhesive may include a polymer such as an epoxy. The adhesive may include a particulate and the particulate may include fused silica. There may be a wavefront sensor for sensing wavefront error and a control system responsive to wavefront errors to drive the actuators to reduce the wavefront errors.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
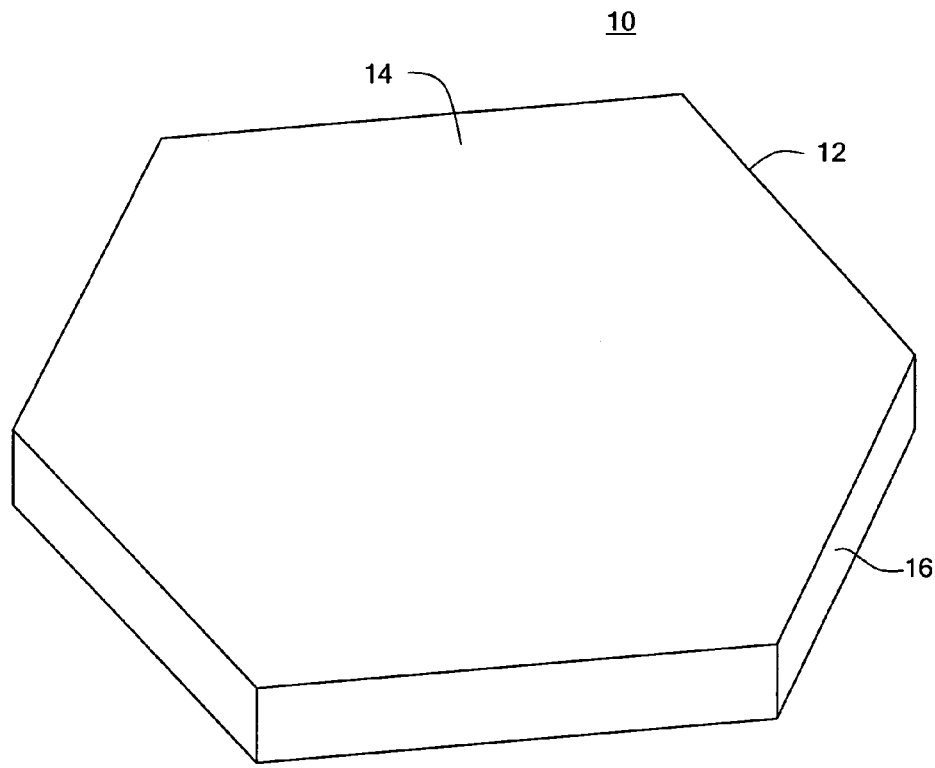
FIG. 1 is a three dimensional diagrammatic view of an active hybrid optical component according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

This invention features an active hybrid optical component 10, FIG. 1, including substrate 12, typically silicon carbide or an equivalent, such as metal, glass, ceramic, polymer and components thereof including but not limited to a Fused Silica, ULE, beryllium, Zerodur, A1 6061-T6, MMC 30% SiC, Be I-70. Be I-220-H, Cu OFC, Cu Glidcop, INVAR® (an alloy comprising iron, nickel, carbon and chromium), 36, Super INVAR® (an alloy comprising iron, nickel, carbon and chromium), Molybdenum, Silicon, SiC HP alpha, SiC CVD beta SoC RB 30% Si, C/SiC, SS 304, SS 416, SS 17-4PH, Ti 6A14V, Gr/EP GY70×30, metal matrix composites, carbon matrix composites, glass matrix composites, and carbon fiber reinforced polymers having a replicated optical surface or film such as mirror surface 14 on one side joined to a support structure 16, on the other side. The replicated optical surface or film 14 may include glass, MYLAR® (ethylene glycol and dimethyl terephthalate) film, or a nanolaminate such as produced by Lawrence Livermore National Laboratory, see *Nano-Laminates: A New Class of Materials for Aerospace Applications* by Troy W. Barbee, Jr., Lawrence Livermore National Laboratory, Livermore, Calif. 94550-9234. These nanolaminates may be from one monolayer (0.2 nm) to hundreds or thousands of monolayers (25–100 microns) thick and are typically made from e.g. zirconium-copper, INVAR® (an alloy comprising iron, nickel, carbon and chromium), MONEL®-titanium. (an alloy comprising nickel, copper, iron and titanium). They are generally made on a mandrel whose surface has been highly figured and finished so when the process is complete the nanolaminate surface is also highly figured and finished. Thus, this substrate no longer need have the surface ground or polished, because the actual optical finish, of much higher quality, is provided by the replicated surface, e.g. a nanolaminate.

Figure 2:
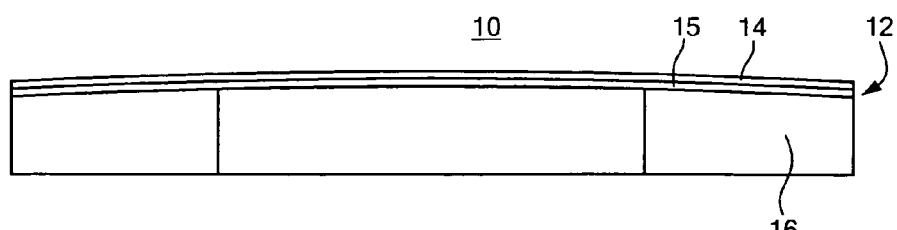
FIG. 2 is a schematic side sectional view of the active hybrid optical component of FIG. 1.

The construction of an active hybrid optical component 10 according to one embodiment of this invention is shown in FIGS. 1 and 2, where replication film 14 is constituted by a nanolaminate attached to substrate 12 by some means 15. The attachment means 15 may be e.g. brazing, solder, diffusion bonding or other bonding such as an adhesive as hereinafter described by way of one example. The adhesive may include epoxies, phenolics, urethanes, anaerobics, acrylics, cyanoacrylates, silicones, polysulfides, elastomeric adhesives.

Figure 3:
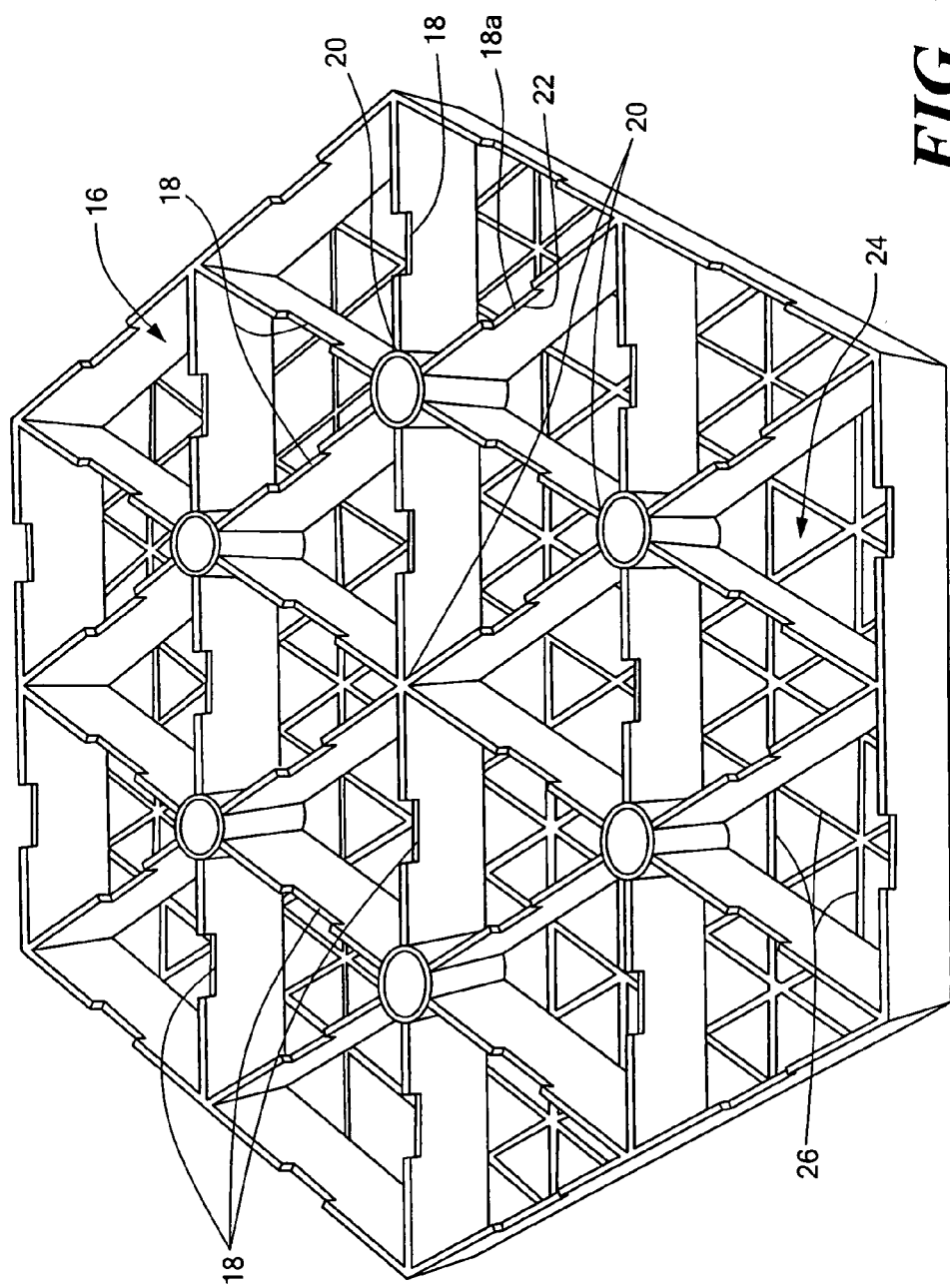
FIG. 3 is a three dimensional view of the other side of the an active hybrid optical component of FIG. 1 showing the support structure.

The support structure 16, FIG. 3, of substrate 12 may include a plurality of major ribs 18, which intersect at a node 20 at the center of a zone of influence. Each major rib, such as rib 18a, includes recess or notch 22 in which an actuator may be located. The actuators deform substrate 16 to impose a predetermined finish and optical shape or figure to the replicated optical surface 14. The array of major ribs creates a honeycomb-like structure supporting back side 24 of surface 14 on which can be located cathedral ribs 26 for strengthening and further supporting surface 14.

Figure 4:
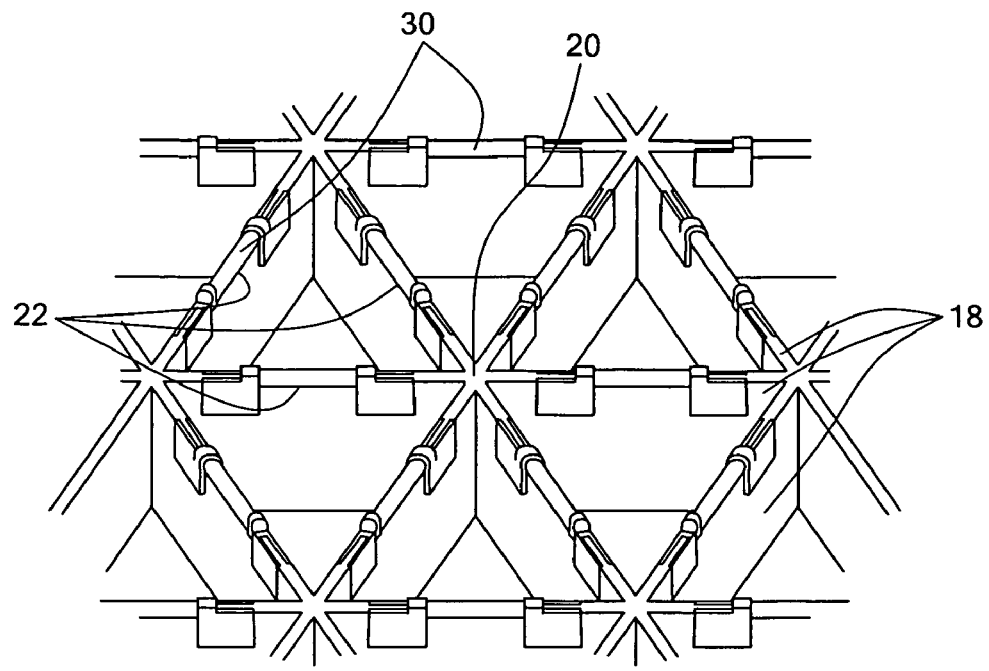
FIG. 4 is an enlarged three dimensional view of a portion of the support structure of FIG. 3 with actuators installed.

Actuators 30, FIG. 4, are embedded in recesses 22 of ribs 18 generally parallel to surface 14 and spaced from it. When operated either by extension or contraction, actuators 30 apply bending moments to alter the shape of surface 14, both locally for correctability, and globally to effect radius of curvature alterations. Because actuators 30 act directly on the support structure in which they are embedded, in this particular embodiment, they require no reaction mass. In addition, even though they may be displacement devices, they can perform a very effective radius of curvature or excursion shape alteration because their effect is cumulative.

Figure 5:
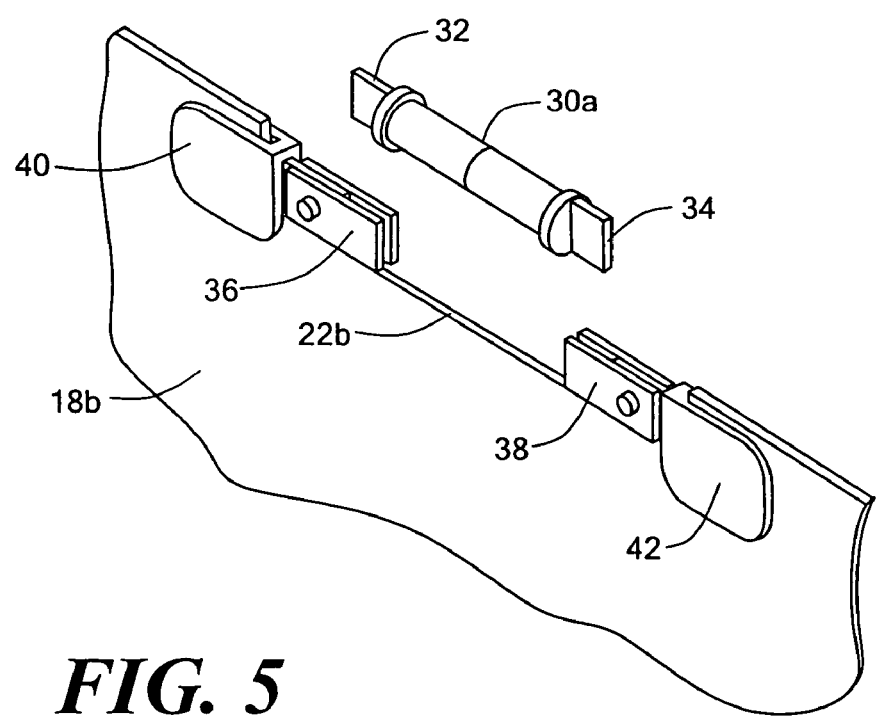
FIG. 5 is an enlarged three dimensional view of an actuator and actuator mounting.

Each of the actuators 30 may be an electrostrictive device or a magnetostrictive device, a piezoelectric device or any other suitable type of actuator such as hydraulic, voice coil, solenoid, mechanical or phase change material such as shape memory alloys or paraffin. In this preferred embodiment, they are illustrated as electrostrictive devices of the lead-magnesium niobate or PMN type which are preferred because they have a low thermal coefficient and very little hysteresis and creep and are dimensionally stable to sub-Angstrom levels. The actuators are characteristically easy to install and replace. For example, actuator 30a, FIG. 5, may contain mounting tabs 32 and 34 which are receivable in mounting clips 36 and 38 mounted in notch 22b of rib 18b. Slots 36 and 38 may be mounted to rib 18b by means of clamps 40 and 42. All of the interfaces may be supplied with an adhesive to permanently bond actuator 30a in position. The actuators may be ambient temperature actuators or cryogenic actuators so that component 10 can be converted from one type of operation to another quite easily by simply removing one type and replacing it with the other.

Figure 6:
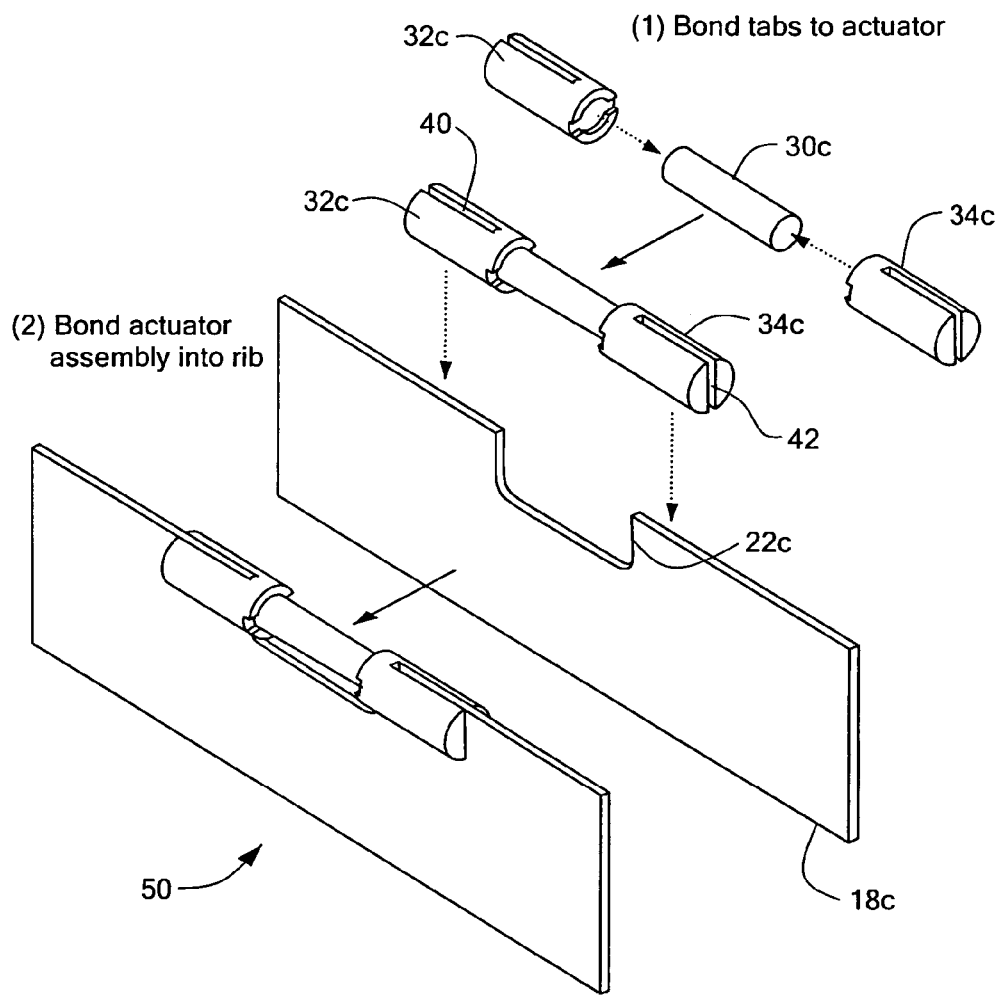
FIG. 6 is an enlarged three dimensional view of another actuator and actuator mounting implementation.

Another type of actuator mounting is shown in FIG. 6 where a three step installation is shown beginning with the actuator 30c being supplied with bonding tabs 32c and 34c which may be glued to it. This assembly is then installed in recess 22c of major rib 18c by engaging the slots 40 and 42 in tabs 32c and 34c with the edges of recess 22c so that the final assembly appears as at 50 in FIG. 6. Again, some or all of the engagements may have an adhesive applied to bond the components.

Figure 7:
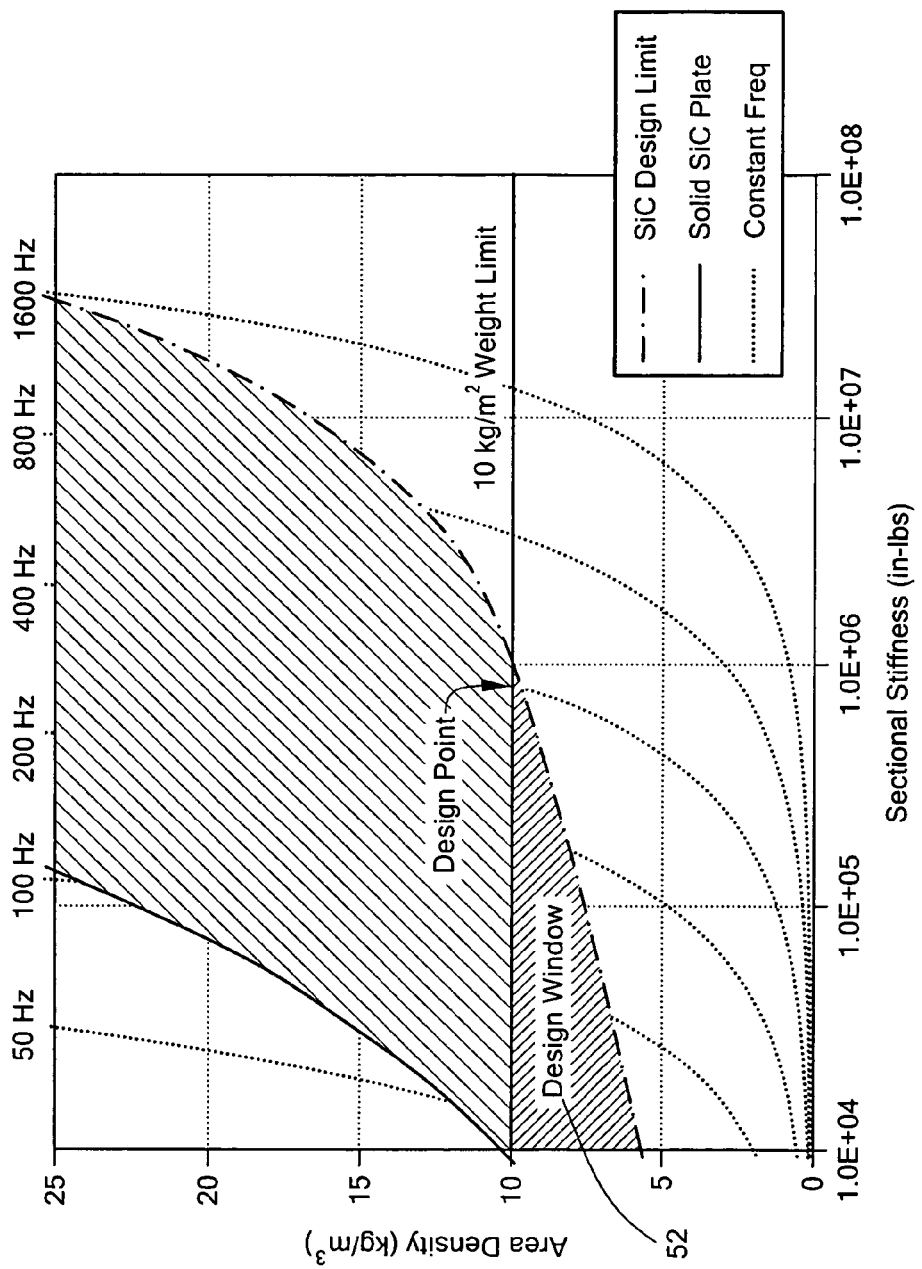
FIGS. 7, 8, and 9 are graphs illustrating the factors effecting stiffness, excursion and correctability, respectively.
Figure 8:
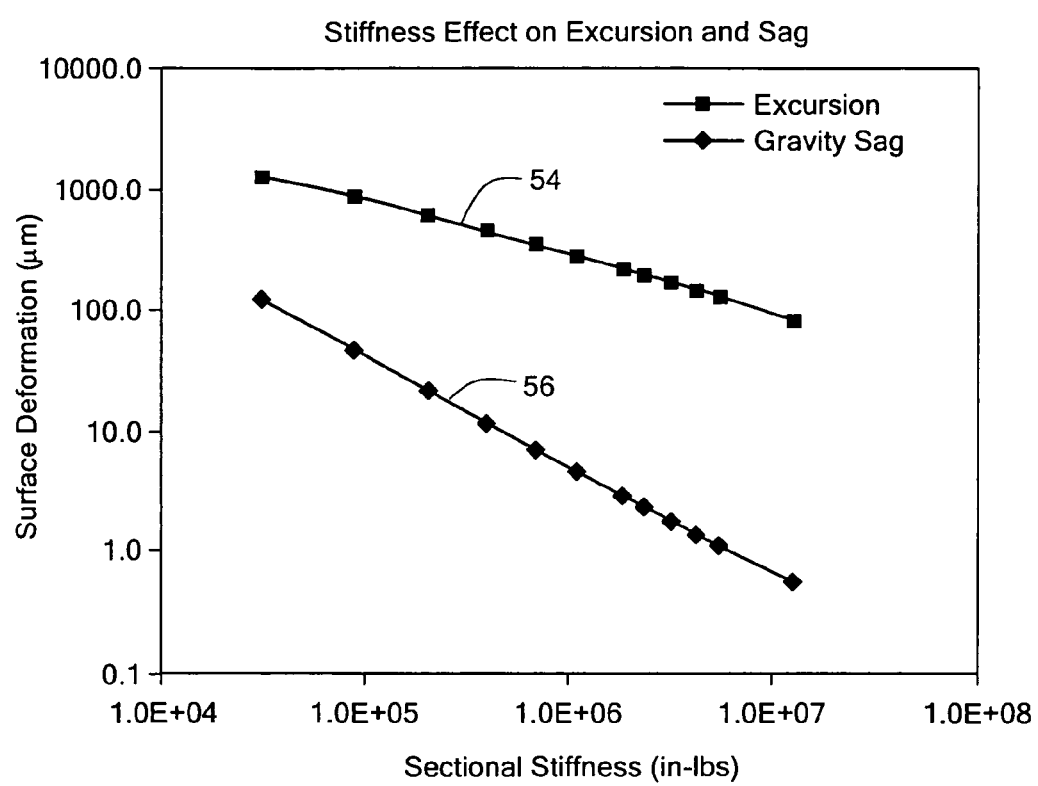
Figure 9:
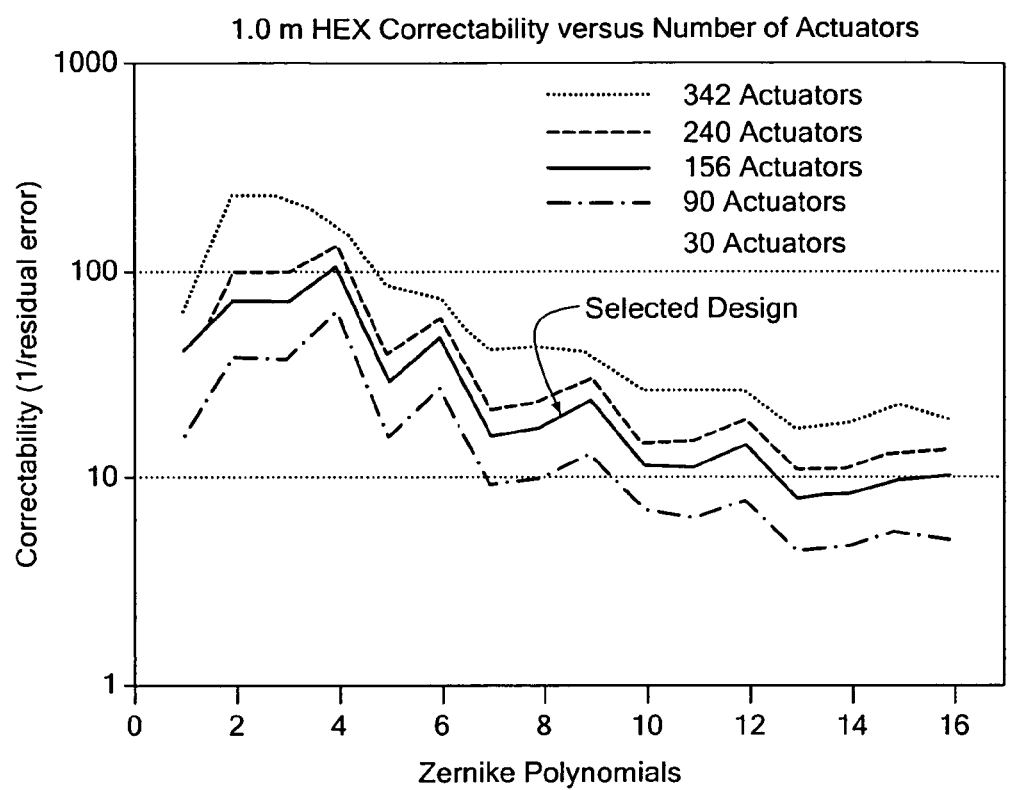

The efficacy of this construction is illustrated in FIGS. 7, 8, and 9. In FIG. 7 the trade-offs with respect to stiffness are displayed where it can be seen that for a design window 52, FIG. 7, defining an areal density of 10 kg/m$^2$ or less, a high stiffness of 1.0E+06 inch pounds can be achieved in conjunction with that low areal density while maintaining a fairly high 300 Hz natural frequency. FIG. 8 illustrates the trade-offs with respect to excursion where the surface deformation associated with excursion and gravity sag are both in satisfactory ranges expressed in sectional stiffness in inch pounds. The trade-off with respect to correctability is demonstrated in FIG. 9 where the correctability is plotted against Zernike polynomials indicating that the localized correction or correctability performs quite well even at high Zernike polynomials with adequate numbers of actuators. And adequate numbers of actuators is not a problem as they are small, lightweight, and can be highly densely packed.

Figure 10:
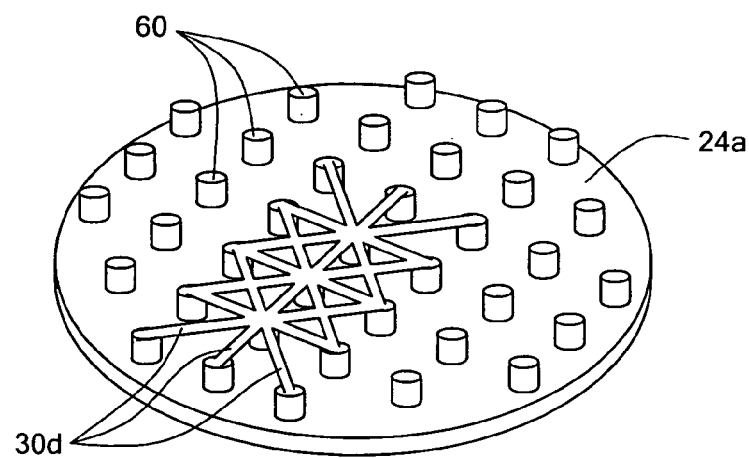
FIG. 10 is a three dimensional view of another support structure for the active hybrid optical component according to this invention.

Although the support structure shown is a honeycomb-like structure formed from the intersecting ribs, this is not a necessary limitation of the invention. For example, in FIG. 10 the support structure on back surface 24*a* of surface 14 constitutes spaced bumps or dimples or posts 60 and the actuators 30*d* are connected between pairs of posts effecting the bending moments and creating the nodes as previously explained with respect to the honeycomb structure.

Figure 11:
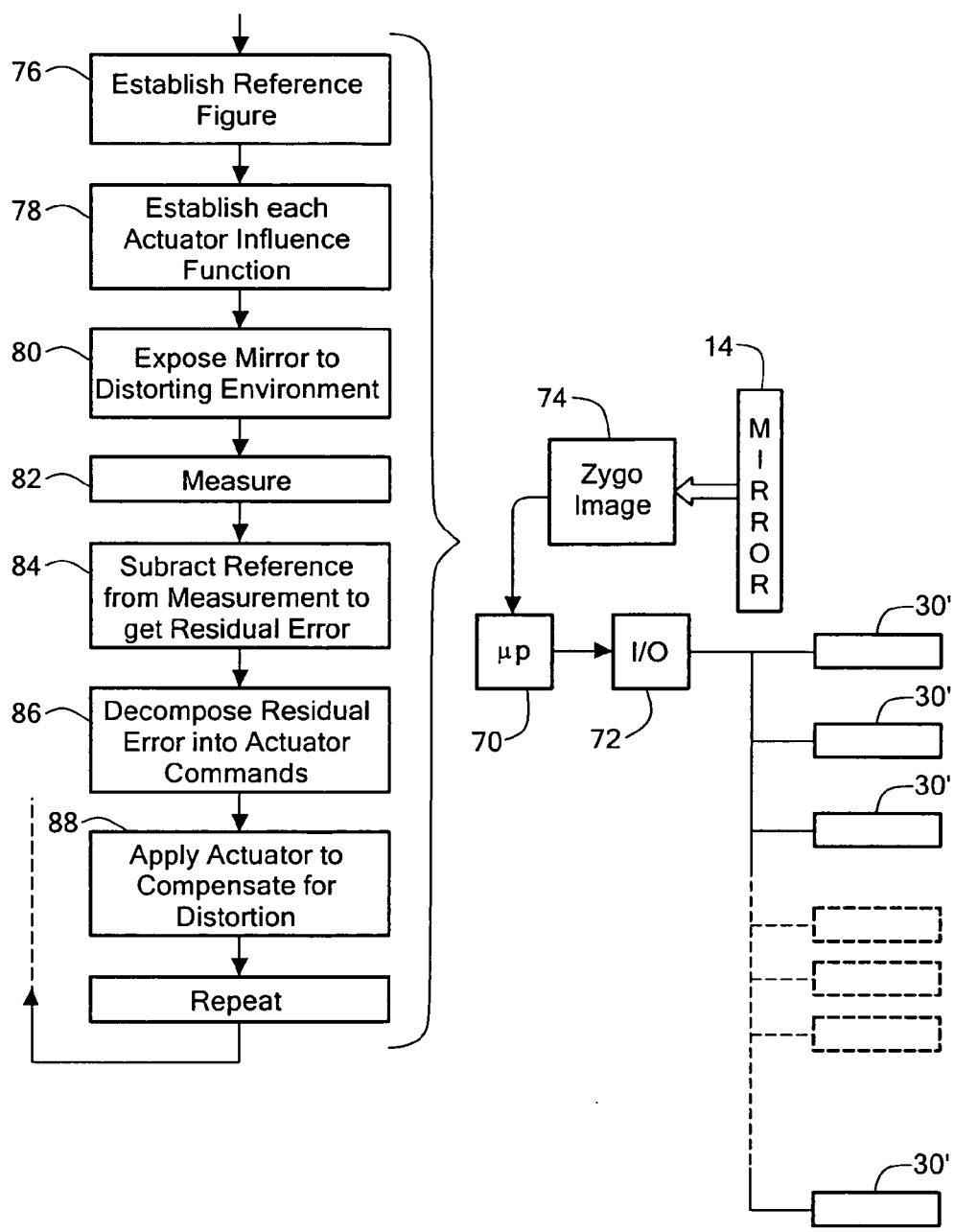
FIG. 11 is a diagram showing the method embodied in software in a microprocessor for driving the actuators to manipulate the shape of the active hybrid optical component.

Any suitable hardware or software system may be used to monitor and feedback control signals to the active hybrid optical component according to this invention. One suitable system is illustrated in FIG. 11 by way of example and not limitation. There microprocessor 70 drives I/O device 72 to provide voltages to actuators 30'. The wavefront sensor 74 such as, a Zygo imaging device or a Hartmann wavefront sensor, monitors mirror surface 14, FIG. 1. Microprocessor 70 is configured with software to establish a reference FIG. 76 and then establish for each actuator an influence function on its associated nodes or zones 78. Mirror surface 14 is then exposed to a distorting environment 80 and once again measured in step 82. The reference is then subtracted from the measurement to get residual error 84 and the residual error is decomposed 86 into actuator commands which are then applied 88 through I/O device 72 to provide the proper voltages to actuators 30'. This routine is carried out repeatedly in order to keep the mirror at the optimum shape or optical figure.

Figure 12:
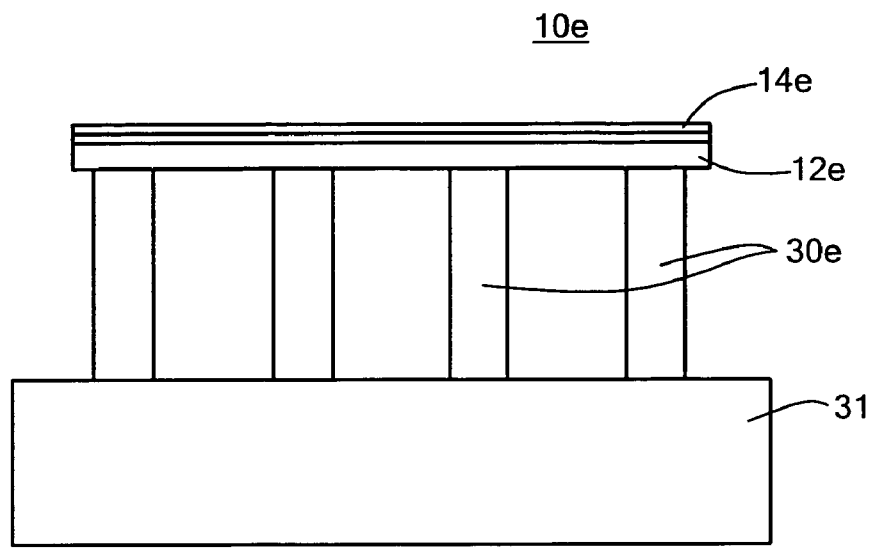
FIG. 12 is a schematic side sectional view of an active hybrid optical component according to this invention with transverse actuators.
Figure 13:
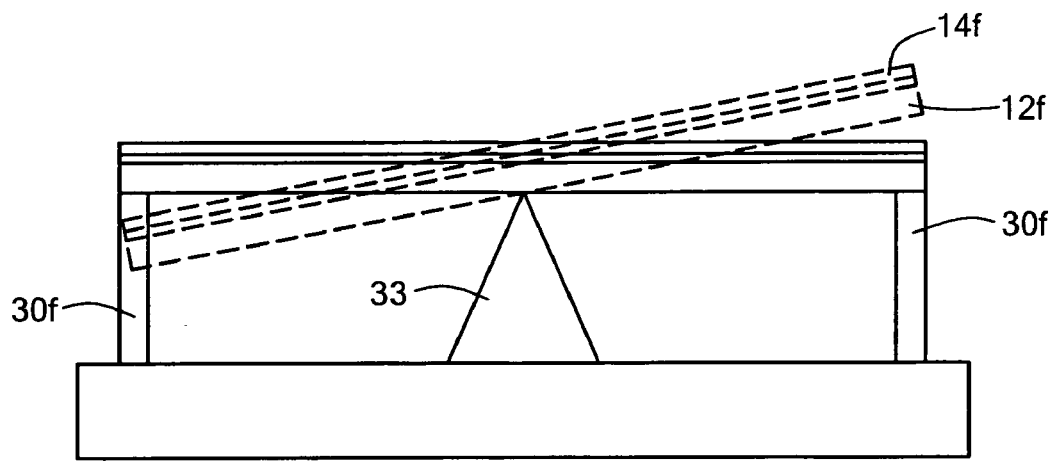
FIG. 13 is a schematic side sectional view of an active hybrid optical component according to this invention with edge actuators.

While thus far the actuator mechanism has been shown as using parallel oriented actuators embedded in the support structure and requiring no reaction mass this is not a limitation of the invention. Active hybrid optical components 10*e*, FIG. 12, may include a replicated optical surface, e.g. 14*e* on substrate, face sheet 12*e*, deformable by transverse actuators 30*e* mounted on reaction mass 31. Alternatively, FIG. 13, face sheet 12*f* with replicated optical surface 14*f* can be edge driven by actuators 30*f* about a central support 33.

A method of making an active hybrid optical component according to this invention particularly using a nanolaminate is described in FIGS. 14–26 following.

Figure 14:
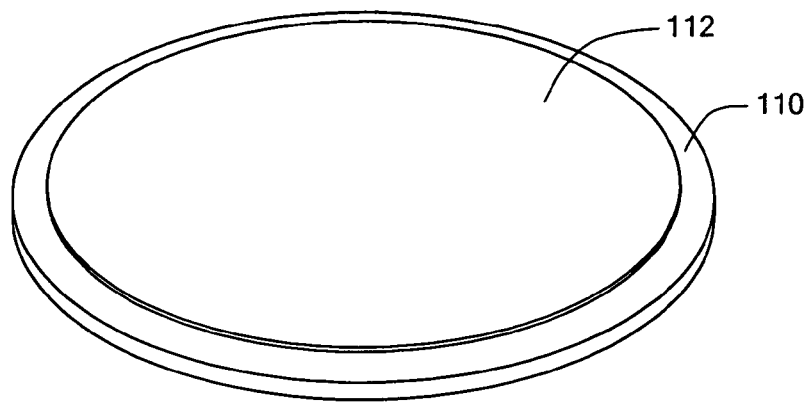
FIG. 14 is a three-dimensional schematic view of a nanolaminate on a mandrel.
Figure 15:
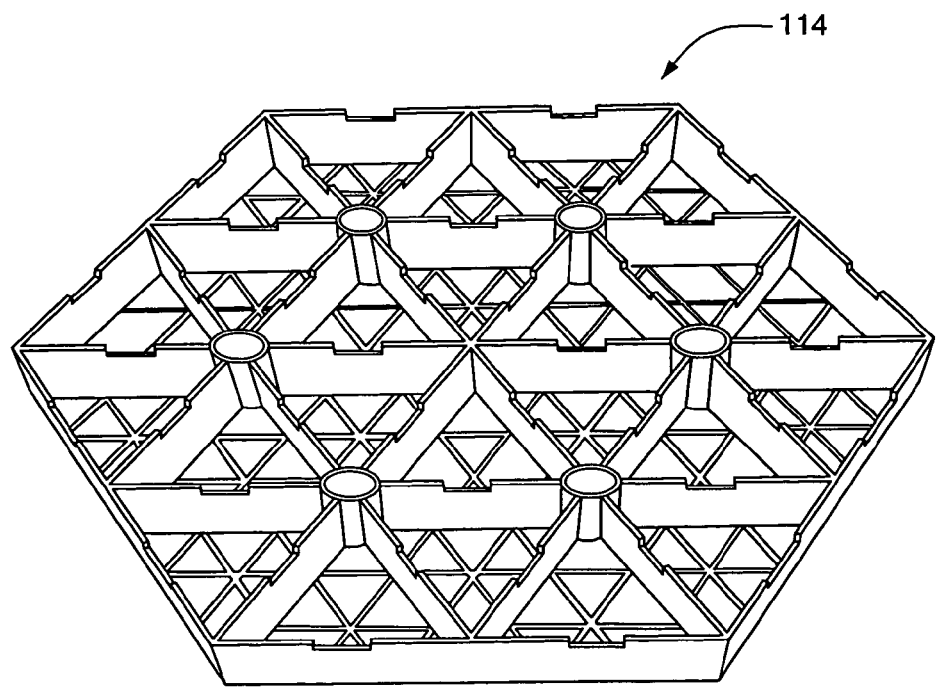
FIG. 15 is a three dimensional schematic view of the underside of an active substrate.
Figure 16:
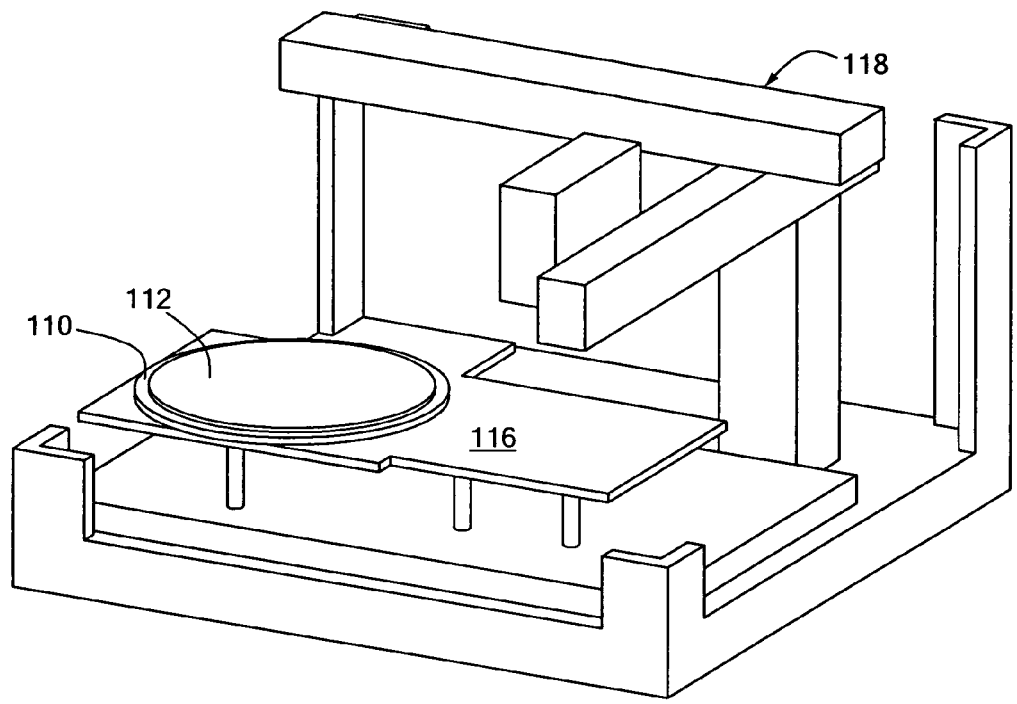
FIG. 16 is a three dimensional schematic view of the mandrel borne nanolaminate on the table of a robot machine.

There is shown in FIG. 14 a mandrel 110 which contains on it a nanolaminate 112 made of, for example, zirconium-copper, INVAR® (an alloy comprising iron, nickel, carbon and chromium) or MONEL®-titanium. (an alloy comprising nickel, copper, iron and titanium) which may be made or may be procured from, for example, Lawrence Livermore National Laboratory. Nanolaminate 112 may be attached to mandrel 110 by means of a parting layer, such as carbon. Substrate 114, FIG. 15, may be a passive substrate or an active one as depicted in FIGS. 1, 3–11, supra. Such technology is also discussed in the form of an active substrate used in an integrated meniscus mirror described in U.S. patent application Ser. No. 10/730,412, filed Dec. 8, 2003, Mark A. Ealey, entitled *Integrated Zonal Meniscus Mirror*, which is herein incorporated in its entirety by this reference. Mandrel 110 with nanolaminate 112 is placed on the table 116, FIG. 16, of a robot machine 118 such as an A&M Saga 5×52 positioning machine.

Figure 17:
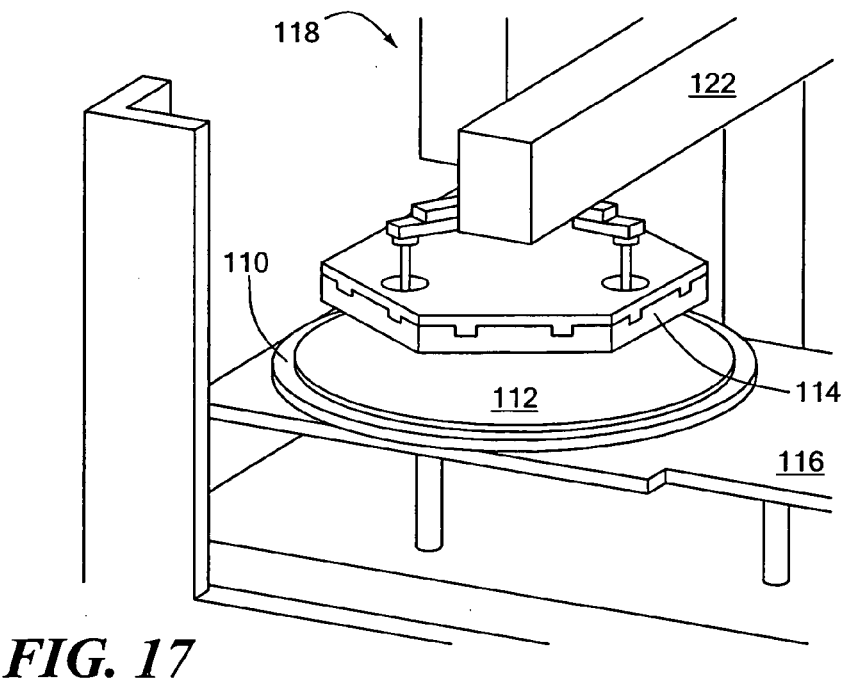
FIG. 17 is a three dimensional schematic view of the mandrel with the active substrate of FIG. 2 supported above it on the arm of the robot machine in preparation for bonding.
Figure 18:
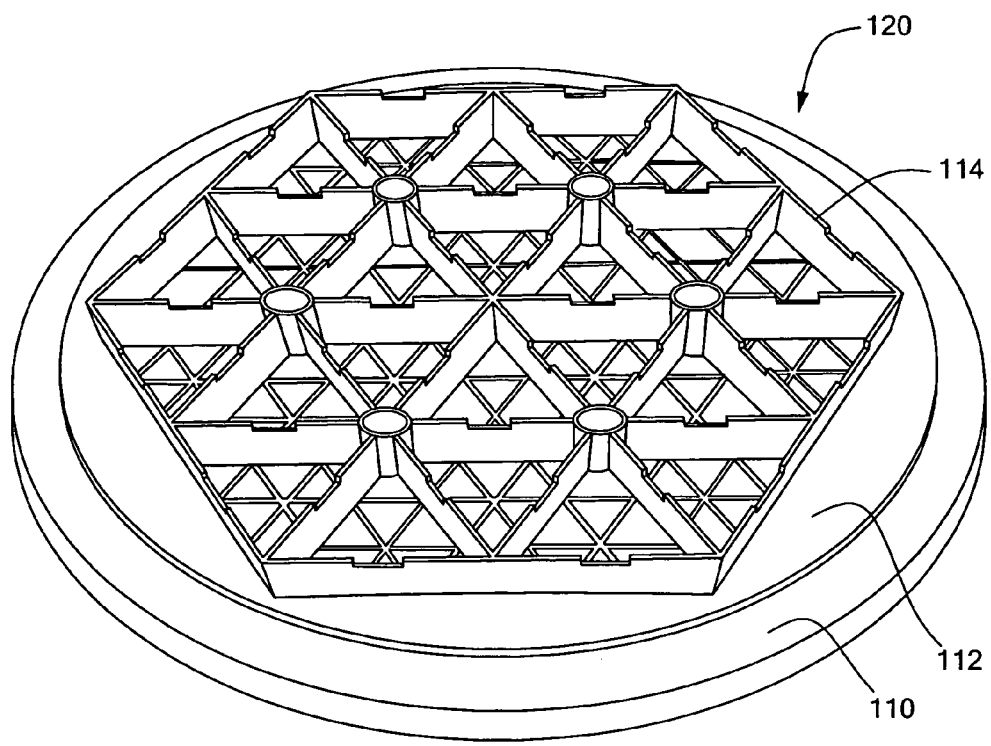
FIG. 18 is a three dimensional schematic view of the bonded assembly of substrate, nanolaminate and mandrel according to this invention.
Figure 19:
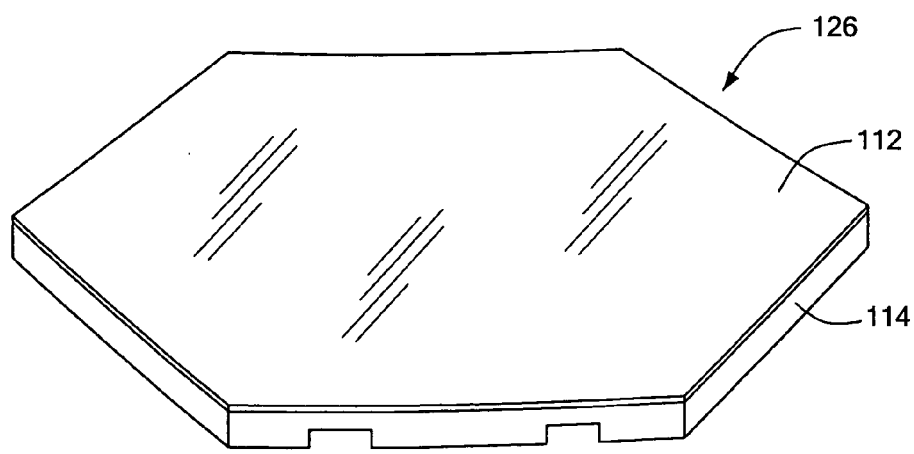
FIG. 19 is a three dimensional schematic view of an active hybrid optical component according to this invention including the substrate bearing the nanolaminate released from the mandrel.

In accordance with this invention, the substrate 114, FIG. 17, is held suspended from the arm 122 of robot machine 118 over and aligned with nanolaminate 112 on mandrel 110. And the two are joined in a suitable way as described above but in this illustrated example bonding by adhesive is preferred. An adhesive is placed between the confronting surfaces of substrate 114 and nanolaminate 112, then the two parts are brought together, the adhesive is distributed over the face and bonding begins. After a period of curing at room temperature, the bonded assembly 120 is put into a temperature chamber where it is cycled, FIG. 18, first to a higher temperature, typically room temperature to 50° C. to complete the curing of the adhesive, typically an epoxy such as #301-2 made by Epoxy Technology Inc., Billerica, Mass. or a special order adhesive #52-180-1 made by Epoxy Technology, Inc. Billerica, Mass. After the curing is complete, the bonded assembly is brought down to room temperature then raised again to an elevated temperature, typically room temperature to 50° C. and then brought down to a reduced temperature, typically room temperature to −20° C. This temperature cycling induces thermal moments in the bonded assembly 120 which enables the nanolaminate to separate from the mandrel on which it was introduced but remain bonded by means of the adhesive to the substrate 114. The end product is a hybrid optical component, mirror 126, FIG. 19, which includes the substrate 114 with a nanolaminate 112 adhered to it.

In this way, in accordance with this invention, then, the highly polished, high quality optic surface provided by the nanolaminate 112 removed from mandrel 110 provides a very high quality optic, while the substrate 114 provides the required stiffness with very little weight. In addition, since the substrate 114 can be an active substrate, such as referred to above, any deformities in the shape or figure of the mirror can be easily accommodated. Further, a number of such mirrors can be made easily and quickly using the same mandrel. That is, the mandrel finish will provide a high quality optical surface on the nanolaminate for many, many forming operations. In the neighborhood of 40 or 50 nanolaminates with high quality optical finishes can be made from a single mandrel before the mandrel has to be resurfaced. The disclosure of the active substrate in U.S. patent application Ser. No. 10/730,412, filed Dec. 8, 2003, Mark A. Ealey, entitled *Integrated Zonal Meniscus Mirror* referred to herein above with its active surface segments can be used here as the active substrate, with, for example, a 25 micron surface finish and then have a nanolaminate of perhaps 0.2 micron finish adhered to it.

Figure 20:
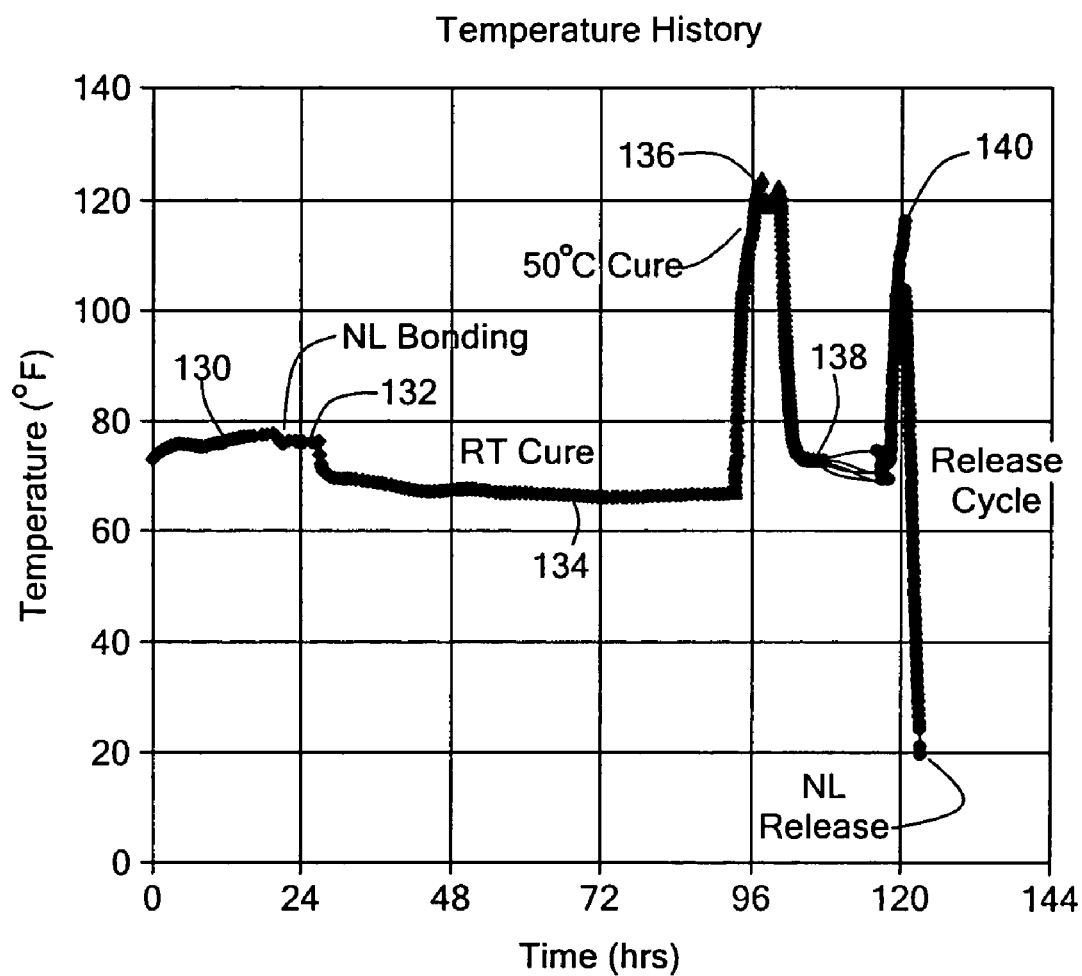
FIG. 20 is a graph of temperature vs. time from the bonding through release.
Figure 21:
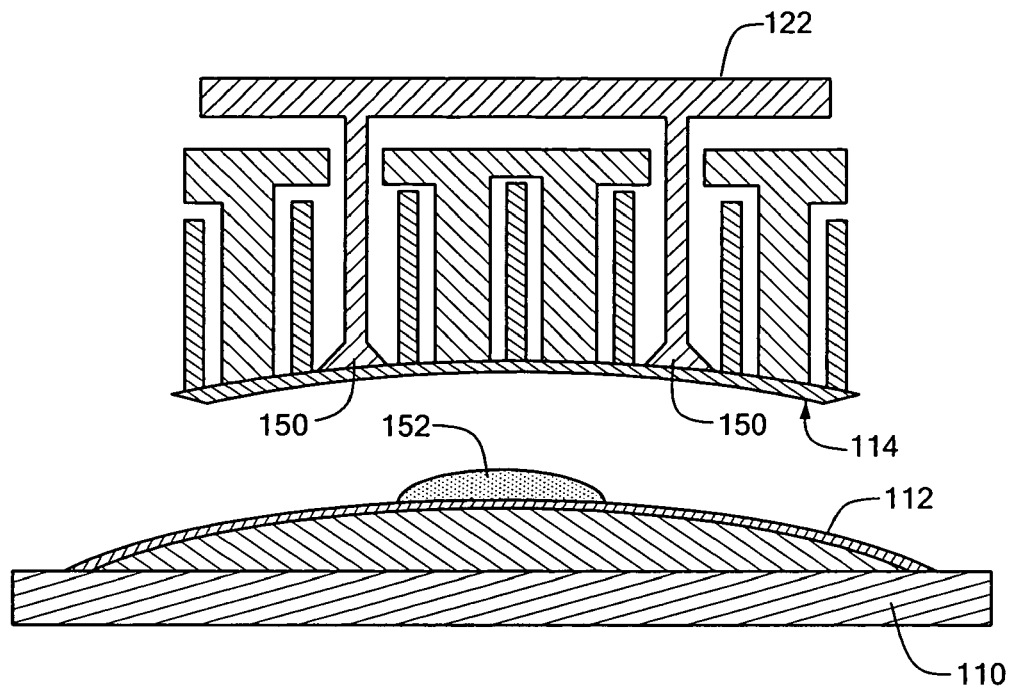
FIGS. 21–24 are schematic side elevational cross-sectional views showing the steps of applying the adhesive, squeezing out the adhesive, curing the adhesive and releasing the nanolaminate from the mandrel.
Figure 22:
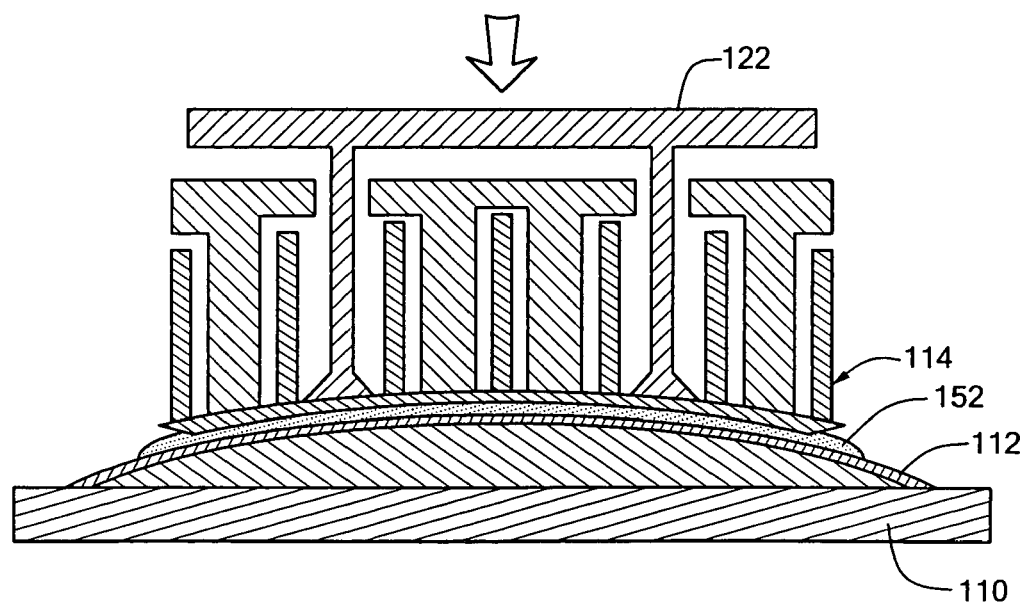

The temperature cycling of the bonded assembly 120 is depicted in FIG. 20, where it can be seen that the mandrel and nanolaminate remain generally at room temperature as shown at 130, FIG. 20, right through the initial bonding at 132. After a three day cure, 134, the temperature is raised to approximately room temperature to 50° C. as at 36 to further cure the epoxy adhesive. The bonded assembly is then reduced to room temperature as at 138 and then less than a day later once again raised to approximately room temperature to 50° C. at 140. Following this the release cycle occurs wherein the bonded assembly is reduced in temperature to somewhere between room temperature and −20° C. At this point the nanolaminate releases from the mandrel due to the thermal moments induced by the temperature cycling but remains attached by the adhesive to the substrate.

Figure 23:
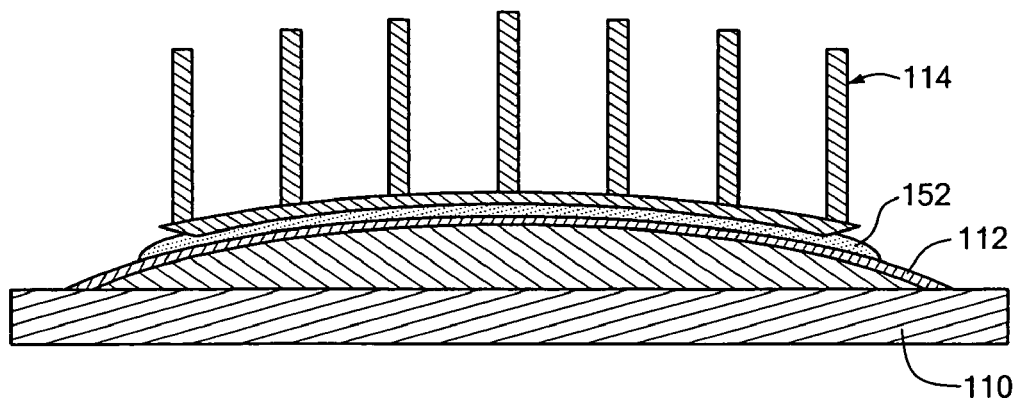
Figure 24:
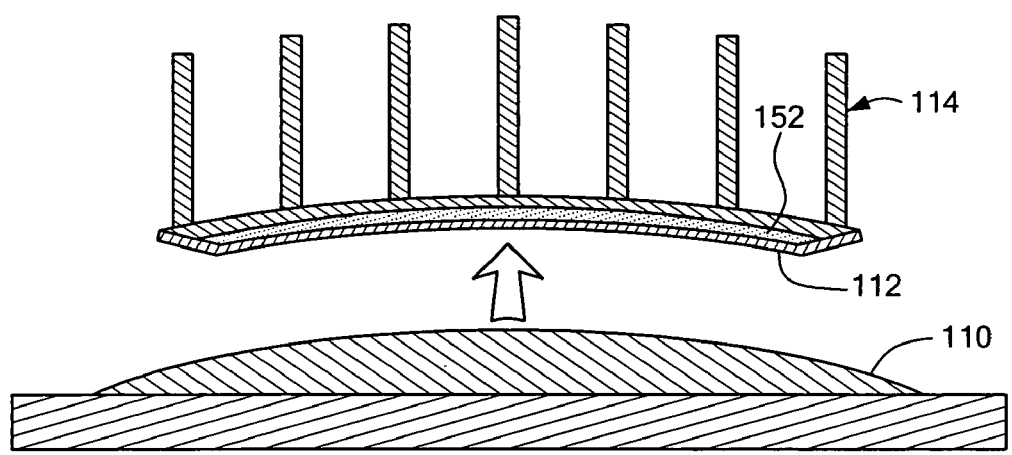

An abbreviated depiction of the steps of the method according to this invention are shown in FIGS. 21–24. Initially, FIG. 21, substrate 114 is gripped by the arm 122 of the robot machine such as for example by using holders e.g. suction cups 150. A drop of adhesive 152 is placed on nanolaminate 112 which is carried by mandrel 110. Arm 122 then brings down substrate 114, FIG. 22, to confront nanolaminate 112. Adhesive 152 is now spread out over both confronting surfaces. Typically the force applied is approximately 70 pounds by arm 122 and then a few more pounds, e.g., 10 to 20, will be added manually using small weights, for example, to bring the adhesive to a uniform gap, preferably at about 2 μ. When the adhesive 152 is squeezed out to a chosen uniformity the entire bonded assembly as shown in FIG. 23 is cured, first at room temperature and then at the elevated temperature. The bonded assembly is then submitted to a cycle of temperature e.g., typically an elevated temperature followed by a reduced temperature which induces thermal moments that cause the nanolaminate 112 to release from mandrel 110, FIG. 24, but remain adhered to substrate 114.

Figure 25:
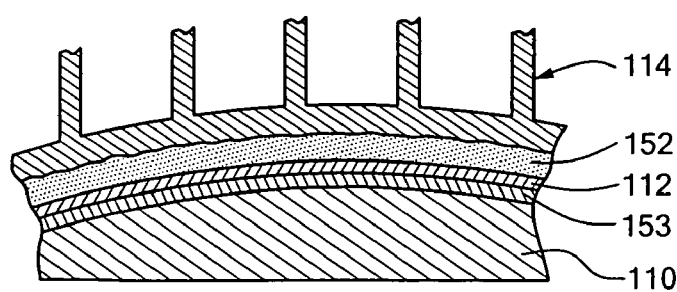
FIG. 25 is an enlarged schematic side elevational cross-sectional view of a portion of substrate-nanolaminate-mandrel assembly illustrating the adhesive.
Figure 26A:
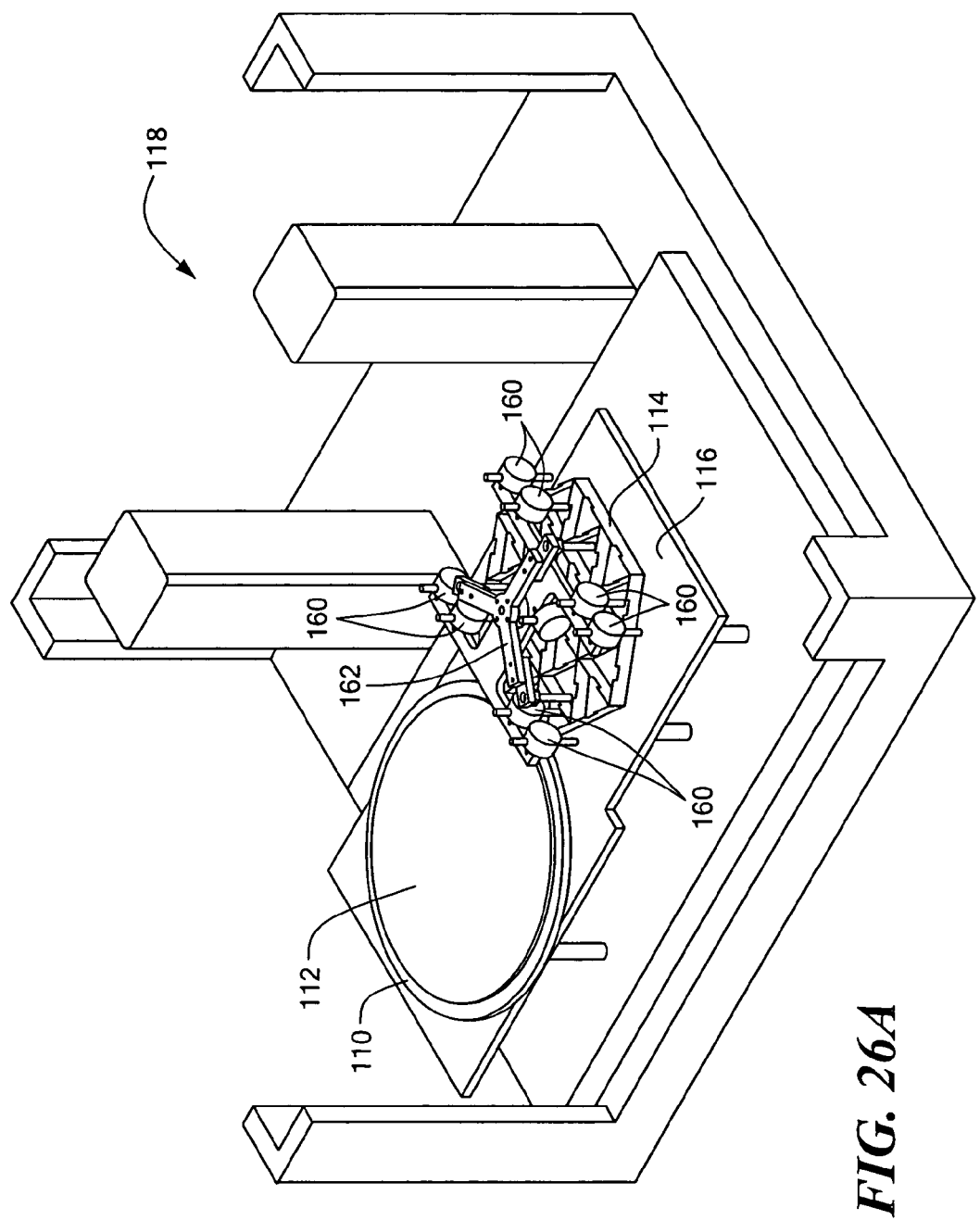
FIGS. 26A–E are three dimensional views of a portion of a robot machine showing the substrate as controlled by the robot arm with displacement dial meters for monitoring the adhesive gap/force.
Figure 26B:
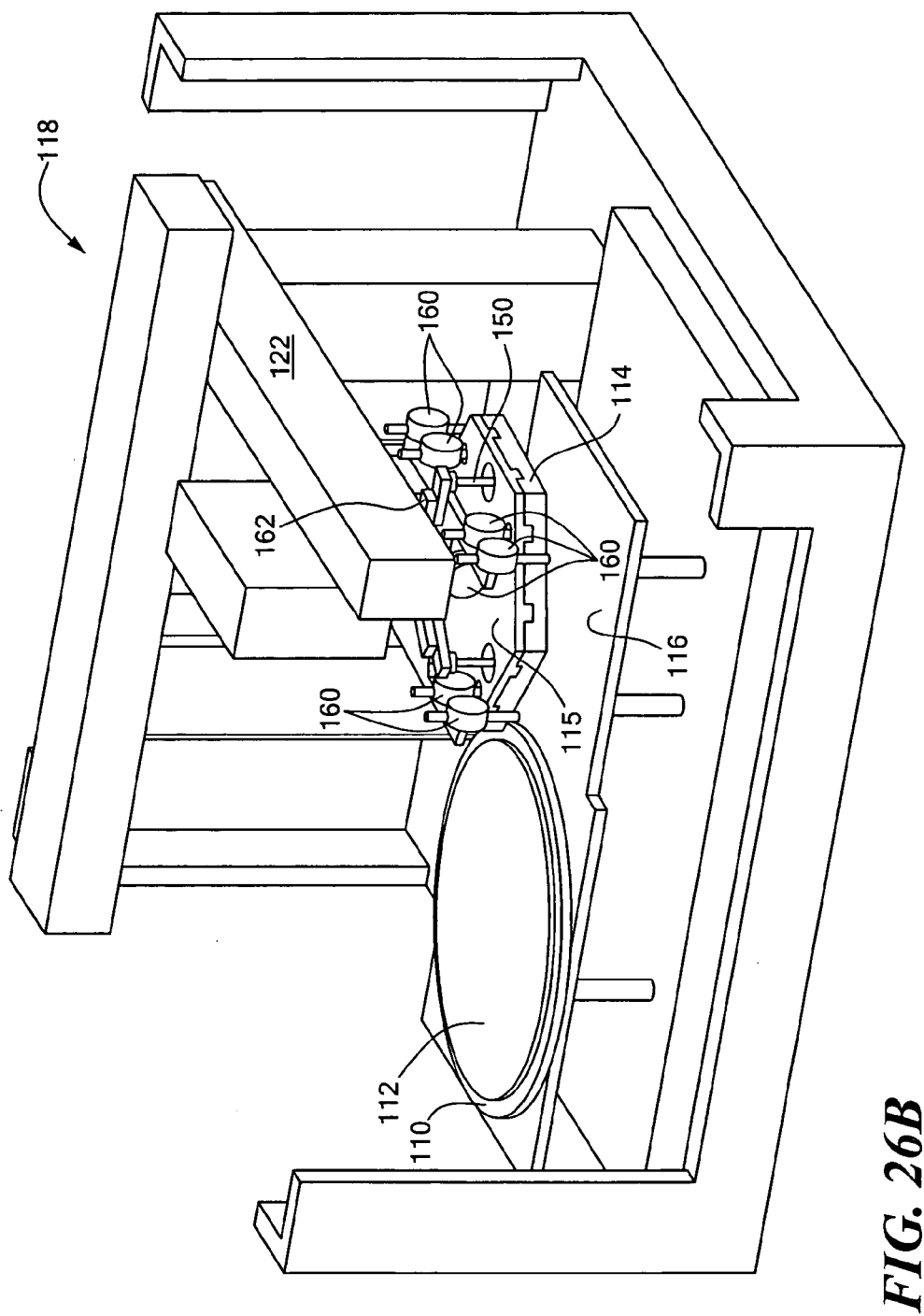
Figure 26C:
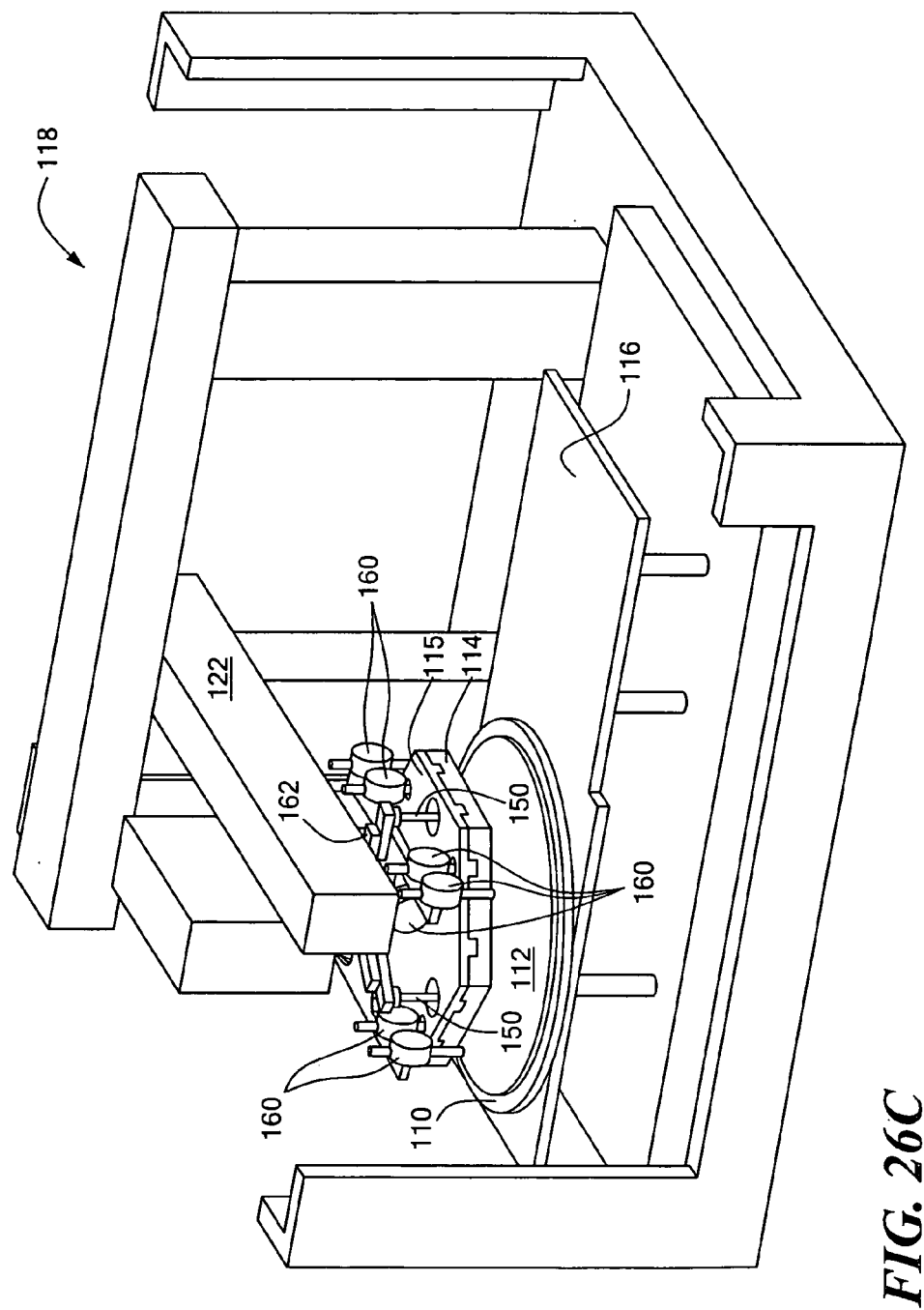
Figure 26D:
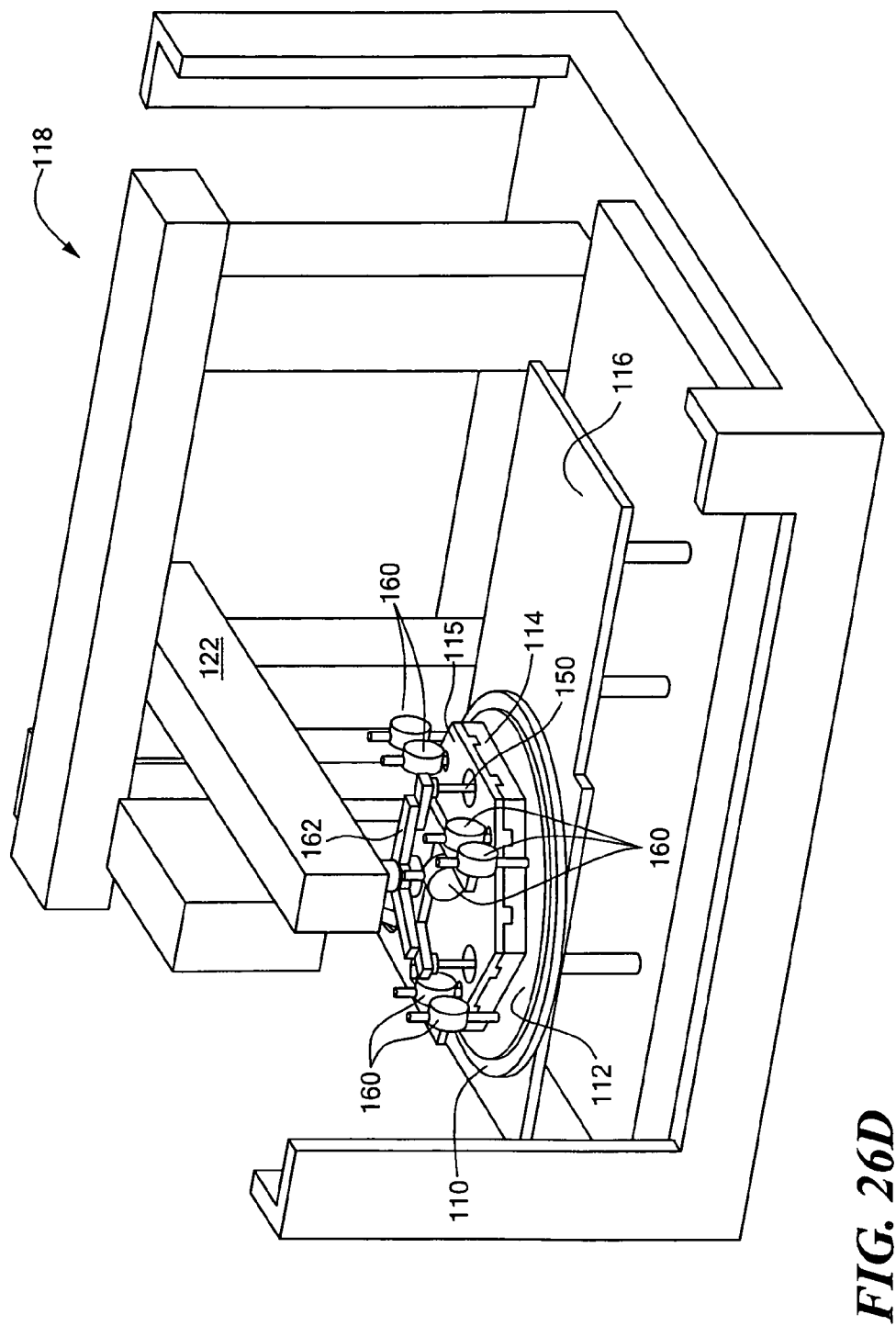
Figure 26E:
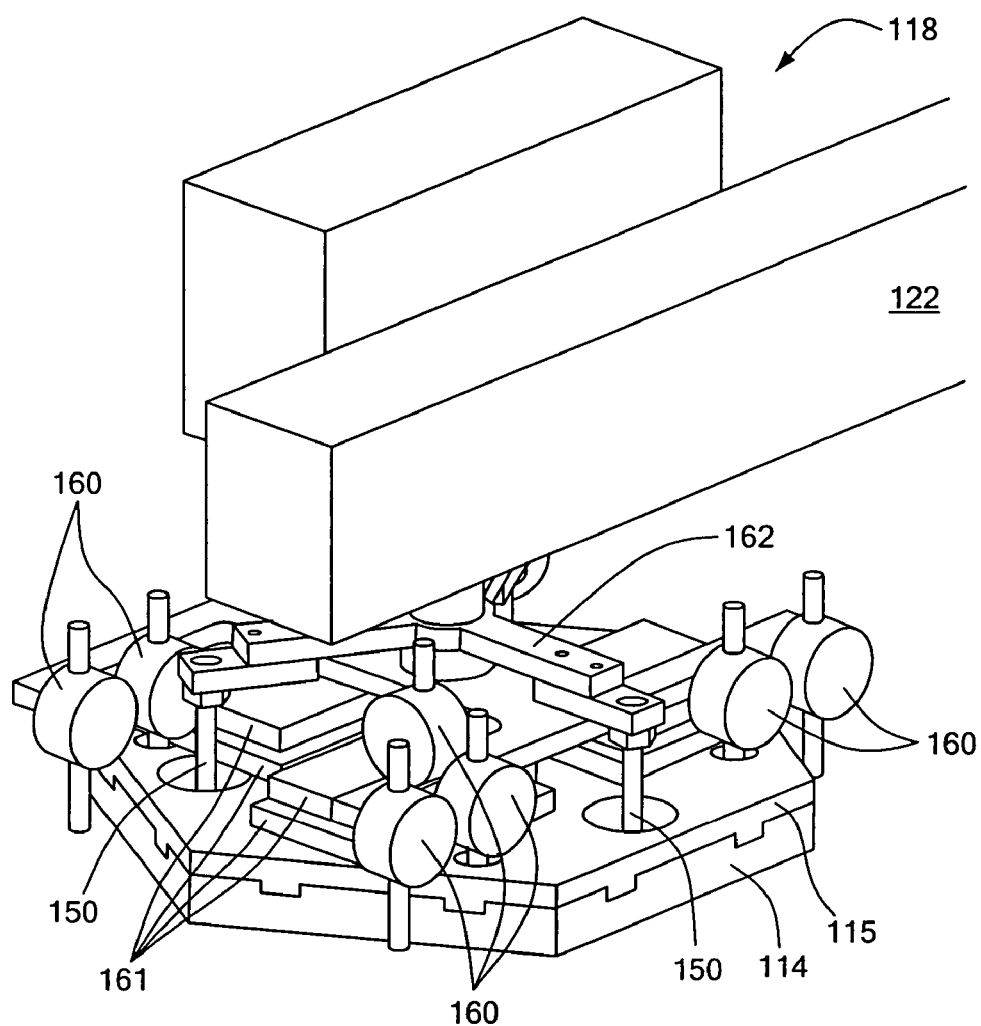

Adhesive 152, FIG. 25, performs the function of adhering nanolaminate 112 to substrate 114, but it also acts to fill and smooth the final surface of nanolaminate 112 when it is adhered to substrate 114 and released from mandrel 112. Typically substrate 112 for this method does not require a lot of final finishing. A finish, for example, of 25μ on its surface will be sufficient: contrast this with nanolaminate 112 whose finish imbued by mandrel 112 may be in the range of 0.2 microns. Were it not for the adhesive, nanolaminate 112 would approach, to some level, the roughness of substrate 114. However, adhesive 152 not only fills the gap, but creates a mitigating medium that tends to average out the roughness associated with substrate 114 and more nearly produce the smoothness inherent in nanolaminate 112. To accomplish this adhesive 152 contains particulate material, in this preferred embodiment fused silica, in the epoxy medium. The fused silica may have a size, for example, of 0.8 microns for a 2.0 micron adhesive layer and the adhesive as indicated can be a #301-2 made by Epoxy Technology, Inc. Billerica, Mass. or it can be a special adhesive 52-180-1 made by Epoxy Technology, Inc., Billerica, Mass. which already has a particulate material in it. The particular material used, whether fused silica or other, and the size of the particulate material as well as the viscosity of the epoxy as applied and the homogeneity of the mixture are all implicated in providing the smooth attachment of the nanolaminate 112 to substrate 114. Other desirable qualities of the gradient adhesive interface appear to be that it is compliant, experiences low volume change during curing, has minimal distortion and a good matching co-efficient of thermal expansion. The combination of these things in the adhesive has only been empirically achieved and will vary depending upon the roughness of the surfaces, the type of epoxy used, the gap desired, and perhaps even other parameters not yet identified. Additionally a commonly used layer, known as a parting layer, 153 is shown. This layer functions to releasably attach the nanolaminate 112 to mandrel 110. This is well known in the art and the materials that are used for this typically include carbon. The final force applied to close substrate 114 on nanolaminate 112 is guided by the use of a number of displacement dial meters 160, FIG. 26A, which may be mounted with holder 162 suspended from arm 122 not visible in FIG. 26A but visible in FIG. 26B. Arm 122, FIG. 26B, lifts substrate 114 which is shown with weighted insert 115 having holes to accommodate holders 150 and dial meters 160. Arm 122, FIG. 26C, traverses to locate substrate 114 over nanolaminate 112. Then after the adhesive is applied, arm 122 lowers, FIG. 26D, substrate 114 to nanolaminate 112. Additional weights 161, FIG. 26E, are added as indicated as necessary by dial meters 160 to produce a force on substrate 114 to result in a desired adhesive gap width and uniformity.

The metrology and the actual feed back and operation of the independent actuatable portions of actuatable substrate 114 do not form a part of this invention and can be done in any suitable fashion, examples of this may be understood from U.S. patent application Ser. No. 10/936,229 filed on Sep. 8, 2004, entitled *Adaptive Mirror System*, by Mark A. Ealey and U.S. patent application Ser. No. 10/935,889 filed on Sep. 8, 2004, entitled *Integrated Wavefront Correction System*, by Mark A. Ealey, each of them herein incorporated in its entirety by this reference. The actuators may be any suitable kind, such as those shown in U.S. patent application Ser. No. 10/730,514, filed Dec. 8, 2003, entitled, *Transverse Electrodisplacive Actuator Array*, by Mark A. Ealey and U.S. patent application Ser. No. 10/914,450, filed on Aug. 9, 2004, entitled, *Improved Multi-Axis Transducer*, by Mark A. Ealey, each of them herein incorporated in its entirety by this reference.

Although in this particular example the optic is a mirror, the invention is not limited to only that type of optic element. In accordance with this method then, by freeing the nanolaminate from the mandrel, in this way, and bonding it to a substrate there has been obtained an optical element with high strength and stiffness, low weight and a high quality optical surface finish. In addition if the substrate is an actuatable substrate then the preparation of the substrate can be minimal as the finished product can be metered and then the proper pattern of actuation imposed on the actuatable substrate to bring the final optical surface into complete conformity with the desired optical figure or form.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An active hybrid optical component comprising:
   a substrate including a mounting surface on one side and a support structure on the other side, the support structure including an array of intersecting major ribs, wherein at least a plurality of said major ribs meet and cross each other;
   a replicated optical surface mounted on said mounting surface;
   a plurality of actuators each mounted in each one of said major ribs for deforming said substrate to impose a predetermined finished optical shape to said replicated optical surface;
   a wavefront sensor for sensing wavefront error; and
   a control system responsive to wavefront errors to drive the actuators to reduce the wavefront error.

2. The active hybrid optical component of claim 1 in which said replicated optical surface includes a nanolaminate.

3. The active hybrid optical component of claim 2 in which said replicated optical surface includes a nanolaminate made from zirconium-copper.

4. The active hybrid optical component of claim 2 in which said replicated optical surface includes a nanolaminate made from an alloy comprising iron, nickel, carbon and chromium.

5. The active hybrid optical component of claim 2 in which said replicated optical surface includes a nanolaminate made from an alloy comprising nickel, copper, iron and titanium.

6. The active hybrid optical component of claim 1 in which said replicated optical surface includes glass.

7. The active hybrid optical component of claim 1 in which said replicated optical surface includes an ethylene glycol and dimethyl terephthalate film.

8. The active hybrid optical component of claim 1 in which said substrate includes glass.

9. The active hybrid optical component of claim 1 in which said substrate includes silicon carbide.

10. The active hybrid optical component of claim 1 in which said substrate includes beryllium.

11. The active hybrid optical component of claim 1 in which said substrate includes carbon fiber reinforced polymer.

12. The active hybrid optical component of claim 1 in which said substrate includes a material selected from the group consisting of metal matrix composite, glass matrix composite, and carbon matrix composite.

13. The active hybrid optical component of claim 1 in which said substrate and said plurality of actuators are configured in an integrated active substrate.

14. The active hybrid optical component of claim 1 in which said actuators are generally parallel to said mounting surface.

15. The active hybrid optical component of claim 1 in which said actuators are generally transverse to said mounting surface.

16. The active hybrid optical component of claim 1 in which said actuators are electromagnetic.

17. The active hybrid optical component of claim 1 in which said actuators are electrostrictive.

18. The active hybrid optical component of claim 1 in which said replicated optical surface is mounted by brazing.

19. The active hybrid optical component of claim 1 in which said replicated optical surface is mounted by solder.

20. The active hybrid optical component of claim 1 in which said replicated optical surface is mounted by diffusion bonding.

21. The active hybrid optical component of claim 1 in which said replicated optical surface is mounted by an adhesive.

22. The active hybrid optical component of claim 21 in which said adhesive includes a polymer.

23. The active hybrid optical component of claim 21 in which said adhesive includes an epoxy.

24. The active hybrid optical component of claim 21 in which said adhesive includes a particulate.

25. The active hybrid optical component of claim 24 in which said adhesive particulate includes fused silica.

* * * * *